United States Patent [19]

Iwata

[11] Patent Number: 4,495,649

[45] Date of Patent: Jan. 22, 1985

[54] POWER SOURCE DEVICE FOR PORTABLE TYPE RADIO APPARATUS

[75] Inventor: Keisuke Iwata, Tokyo, Japan

[73] Assignee: Iwata Electric Co., Ltd., Tokyo, Japan

[21] Appl. No.: 454,411

[22] Filed: Dec. 29, 1982

[30] Foreign Application Priority Data

Dec. 30, 1981 [JP] Japan ............................ 56-211401

[51] Int. Cl.³ ...................... H04B 1/02; H04B 17/00
[52] U.S. Cl. ................................ 455/115; 340/654; 375/71; 455/117
[58] Field of Search ............... 455/127, 117, 115, 73; 375/70, 71; 340/654; 307/592, 596; 361/89

[56] References Cited

U.S. PATENT DOCUMENTS 3,469,191  9/1969  Russell, Jr. et al. ............... 455/115
3,500,459  3/1970  Battin et al. ......................... 455/115

*Primary Examiner*—Marc E. Bookbinder
*Attorney, Agent, or Firm*—Robert E. Burns; Emmanuel J. Lobato; Bruce L. Adams

[57] ABSTRACT

A power source device for a portable type radio apparatus having a transmitting circuit wherein the transmitting circuit is connected to the power source through a time constant circuit and a tone signal generating circuit is connected to the time constant circuit through a delay timing circuit. The tone signal generating circuit is operated at a required time before the operation of the transmitting circuit is terminated by the time constant circuit to inform a user of the fact that the transmitting circuit is about to be stopped in operation.

3 Claims, 2 Drawing Figures

- (a) POWER SOURCE 11
- (b) VOLTAGE OF CAPACITOR 17
- (c) TRANSISTOR 18
- (d) TRANSISTOR 29
- (e) CHARGING STATE OF CAPACITOR 17

POWER SOURCE DEVICE FOR PORTABLE TYPE RADIO APPARATUS

FIELD AND BACKGROUND OF THE INVENTION

The present invention relates to portable type radio apparatus, and more specifically, to a portable type radio apparatus having a power source device which can save consumption of electric power.

As a power source for a portable type radio apparatus, a battery having a relatively small capacity is used in order to minimize the volume of the whole radio apparatus. Therefore, various improvements have been made so as to achieve the desired transmit-receiving purpose while controlling the power consumption, that is, the loss of the battery. For example, such an improvement has been made on the receiver in a personal radio paging system wherein when one has to get in touch with an individual who has gone out or away from his seat, a radio wave signal is sent to him for communication. In the conventional receiver of this system, a receiving circuit is connected to the output side of a manually operated power source switch through an electronic switching circuit, and the switching circuit is turned on and off by an intermittent pulse output signal of a multivibrator for generating a rectangular signal. Accordingly, since a power source voltage is intermittently supplied to the receiving circuit, it is possible to control the consumption of the battery so that the receiver may be utilized for a long period of time.

On the other hand, for a portable type radio apparatus of the duplex speech type provided with a transmitter, it requires a great deal of power to provide an aural output. Considerable power is required because of the operation of the transmitter and this poses a significant task in power source management such as a precaution not to forget to turn the power source switch off.

SUMMARY OF THE INVENTION

It is an object of the present invention to provide a power source device for a portable type radio apparatus which can control the loss of power consumption by a simple configuration.

It is a further object of the invention to provide a power source device for a portable type radio apparatus which can inform a user of the fact that the power source is to be turned off after the lapse of a preset period of time after the power source is turned on.

In accordance with the present invention, there is provided a power source circuit for a portable type radio apparatus having a transmitting circuit, comprising a power source, a time constant circuit including a capacitor connected to the output side of said power source so that said power source voltage is intermittently applied to said transmitting circuit, a delay timing circuit which provides an output after the lapse of a preset time by an output signal of said time constant circuit, and a tone signal generating circuit operated by an output signal of said delay timing circuit to generate a tone signal representative of the fact that the required time has passed.

According to a preferred embodiment of the present invention, the time constant circuit has a switching circuit composed of transistors so that the power source voltage may be applied to the transmitting circuit through the time set by the time constant circuit. The delay timing circuit is also composed of transistors and is provided with a control bias circuit for setting the operating time of the transistors. In accordance with the configuration of the present invention, it is possible to inform a user in advance of the fact that the transmission is rendered impossible by the aural signal from the tone signal generating circuit when the required time has passed after the power source has been turned on. In case the transmission has been completed and the power source switch is forgotten to be turned off, it is possible to prevent the power source switch from being forgotten to be turned off by an alarm sound.

In addition, according to the portable type radio apparatus of the present invention, there is provided a push button switch which is connected in parallel with the capacitor of the time constant circuit, and the capacitor is forcibly discharged by the depression of said push button switch. Accordingly, when the tone signal generating circuit provides an alarm sound, if one desires to continue transmission, the push button switch may be depressed to continue transmission since the time constant circuit assumes its initial state.

DESCRIPTION OF THE PREFERRED EMBODIMENTS

Figure 1:
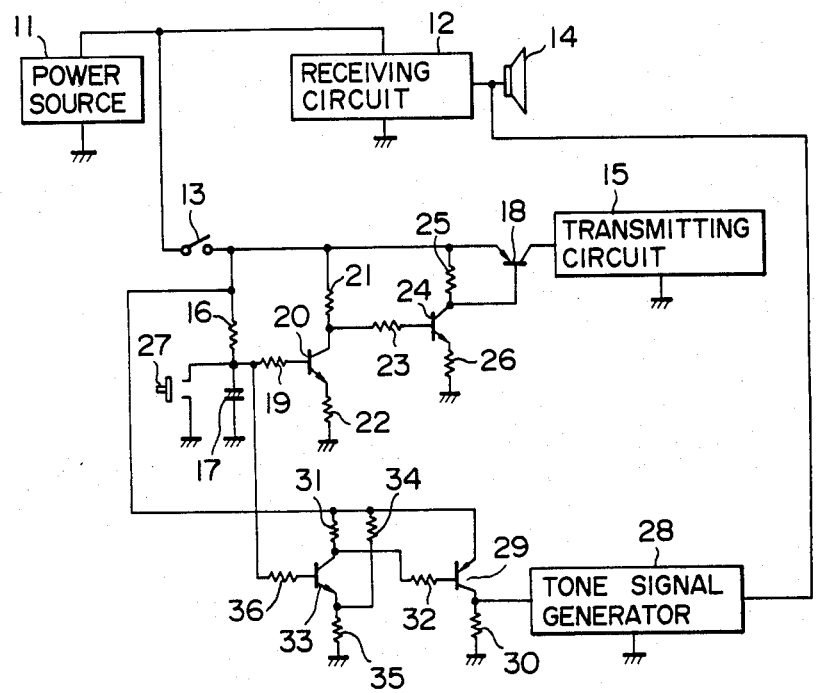
FIG. 1 is a circuitry representation showing one embodiment of a power source device in accordance with the present invention.

Referring to FIG. 1, a power source 11 such as a battery is connected to an input of a receiving circuit 12 and to an input of a manually operated power source switch 13. A speaker 14 is connected to an output of the receiving circuit 12. While in this embodiment, a voltage is always supplied to the receiving circuit 12 to render the receiving possible, it is noted that as in prior arts as described above, the manually operated power source switch, the electronic switching circuit and the multivibrator for controlling said switching circuit can be provided to control the power consumption.

To the output side of the power source switch 13 is connected a time constant circuit comprising a resistor 16 for controlling a supply of a power source voltage to a transmitting circuit 15, and a capacitor 17. An input side of the transmitting circuit 15 is connected to a collector of a PNP type first switching transistor 18 whose emitter is connected to the power source switch 13. To a node between the resistor 16 and the capacitor 17 in the time constant circuit is connected a base of a first control transistor 20 for controlling the first switching transistor 18 through a resistor 19. This first control transistor 20 has a collector connected to the output side of the power source switch 13 through a resistor 21 and has an emitter grounded through a resistor 22. To a node between the collector of the first control transistor 20 and the resistor 21 is connected a base of a second control transistor 24 through a resistor 23. The second control transistor 24 has a collector connected to a base of the first switching transistor 18 and connected to the output side of the power source switch 13 through a resistor 25. The second control transistor 24 has an emitter grounded through a resistor 26. That is, the first and second control transistors 20 and 24 constitutes a timing circuit. A push switch 27 connected in parallel with the capacitor 17 of the time constant circuit is provided to manually control the discharge of the capacitor 17.

To the output side of the power source switch 13 is connected an emitter of a second switching transistor 29 for switching-controlling the operation of tone signal generating circuit 28. The second switching transistor 29 has a collector grounded through the input side of the tone signal generating circuit 28 and a resistor 30. The second switching transistor 29 has a base connected to the output side of the power source switch 13 through resistors 31 and 32 connected in series. To a node between the resistors 31 and 32 is connected a collector of a third control transistor 33 for controlling the operation of the second switching transistor 29. The third transistor 33 has an emitter connected to the output side of the power source switch 13 through a resistor 34 and connected to the earth through a resistor 35. The transistor 33 has a base connected to the input side of the resistor 19 through a resistor 36. That is, the transistors 29 and 33 constitute a delay timing switch circuit. The tone signal generating circuit 28 is a signal generator which informs a user of the fact that the power source is to be turned off after the lapse of preset time, the output side of the signal generator being connected to the input side of the speaker 14.

Figure 2:
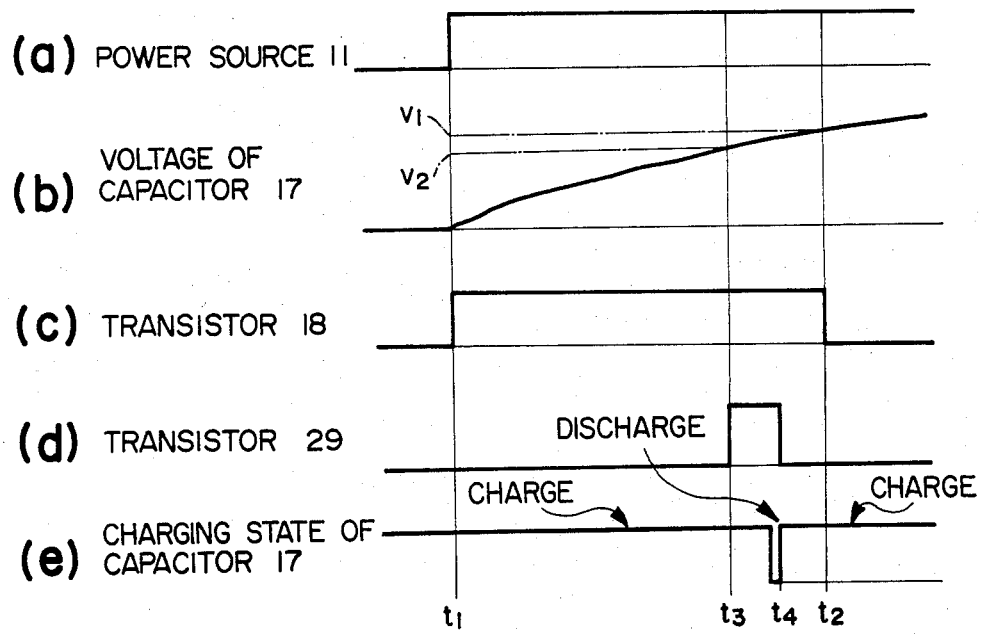
FIG. 2 is a time chart of signals in the FIG. 1 circuit.

Next, the operation of the power source circuit will be described. To operate the transmitting circuit 15, the power source switch 13 is turned on as shown in FIG. 2(a). Then, the capacitor 17 begins charging at time $t_1$ of FIG. 2 at a time constant which is determined by the capacitor and the resistor 16. Since the current applied to the base of the first control transistor 20 is not enough to operate said transistor until the terminal voltage of the capacitor 16 reaches a set level $v_1$, the transistor 20 remains turned off. Therefore, the collector potential is at the level of the power source voltage, whereby the second control transistor 24 is turned on. Accordingly, the transistor 24 is lowered in collector potential to turn the first switching transistor 18 on to supply the power source voltage to the transmitting circuit 15 to render the transmission possible. This status is shown in FIG. 2(c).

On the other hand, the third control transistor 33 is off, the collector potential of which is high to turn the second switching transistor 29 off. Therefore, the collector potential of the second switching transistor 29 is at a ground potential to turn the operation of the tone signal generating circuit off.

However, immediately after the terminal voltage of capacitor 17 reaches a set level $v_1$ as a result of the charging thereof, the first control transistor 20 is turned on to lower the base potential of the second control transistor 24. Therefore, the transistor 24 is turned off and the base and emitter potentials of the first switching transistor assume the same level, as a consequence of which the first switching transistor 18 is turned off.

In this manner, the operation of the transmitting circuit 15 stops at time $t_2$. During the charging of the capacitor 17, the transmitting circuit 15 is operated as previously mentioned. However, a current does not flow between the base and emitter of the third transistor 33 due to the forced bias of the resistor 34 during the charging of the capacitor 17. Thus, as the terminal voltage of the capacitor 17 reaches a level above the set level $v_2$ based on said forced bias potential, the second switching transistor 29 is also turned on at time $t_3$ as shown in FIG. 2(d). In this manner, the collector potential of the second switching transistor 29 increases and the tone signal generating circuit 28 operates to generate from the speaker 14 a tone signal which calls the user's attention to the stoppage of transmission. That is, at time $t_3$ prior to the stoppage of operation of the transmitting circuit 15, the tone signal is put out to inform a user of the fact that the transmissible time is terminated.

On the other hand, if one desires to continue transmitting before the transmitting is stopped, the push switch 27 is depressed to turn it on. Thereby, the capacitor 17 is completely discharged through the switch 27. This switch 27 is turned off by releasing the same and the capacitor 17 is recharged to form a transmissible status as shown in FIG. 2(e). At this time, the third control transistor 33 is also turned off and the operation of the tone generating circuit 28 stops.

What is claimed is:

1. A power source device for operating a portable type radio apparatus having a transmitting circuit, comprising: a power source, a time constant circuit including a capacitor connected to the output side of said power source and a switching circuit coupled to said time constant circuit and said power source for applying the power source voltage to said transmitting circuit to effect the operation thereof for a predetermined time, delay timing circuit means operative to produce an output signal after the lapse of a preset time by an output signal of said time constant circuit, a tone signal generating circuit responsive to the output signal of said delay timing circuit means to generate a tone signal representative of the fact that a required time related to said preset time has passed, and switch means connected in parallel with the capacitor of said time constant circuit for effecting a continuation of the operation of said transmitting circuit.

2. A power source device according to claim 1, wherein said switching circuit includes a transistor connected to be turned on and off by an output of said time constant circuit to control the supply of said power source voltage to said transmitting circuit.

3. A power source device according to claim 1, wherein said delay timing circuit means includes a transistor and a bias circuit for setting the operating level of said transistor.

* * * * *